Nov. 11, 1941.    H. T. LAMBERT    2,262,709
BRAKE CONSTRUCTION WITH AIR COOLING MEANS
Filed Oct. 3, 1940
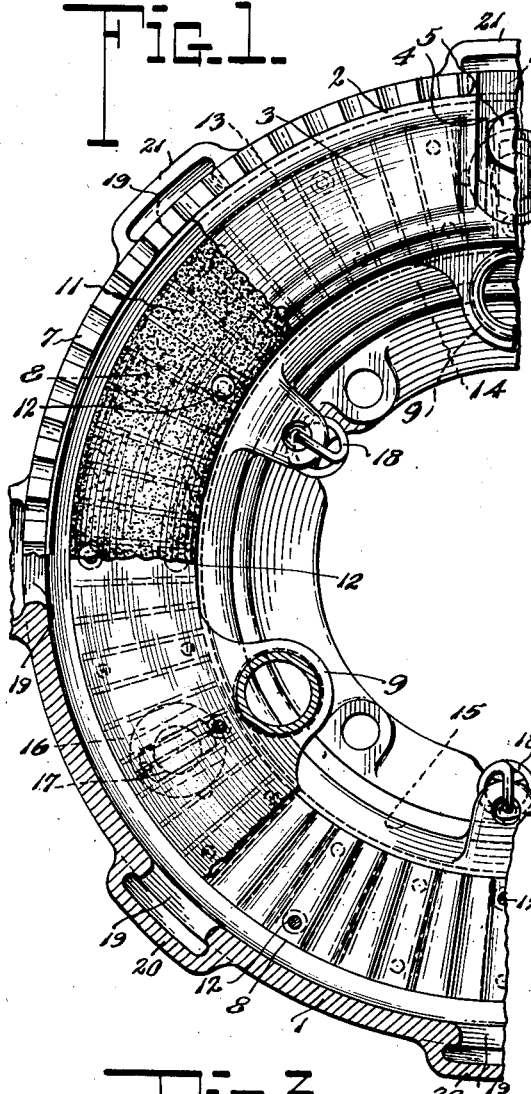
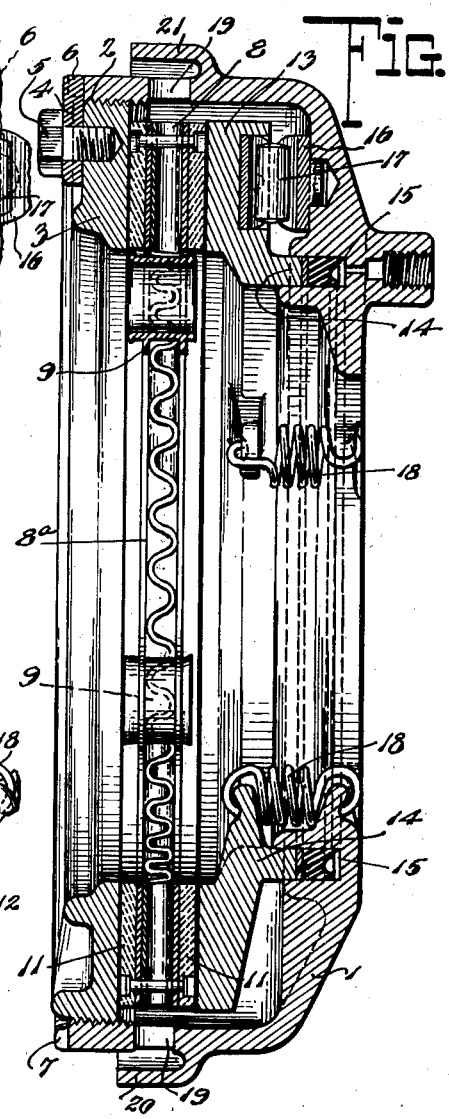
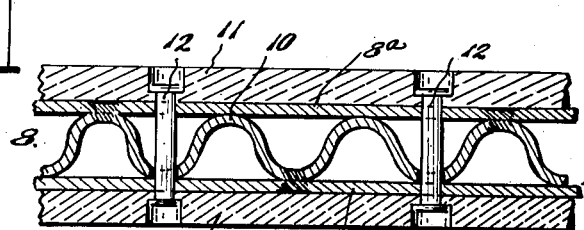
Inventor
H. T. Lambert
By Robb & Robb
Attorneys Patented Nov. 11, 1941

2,262,709

UNITED STATES PATENT OFFICE 2,262,709

BRAKE CONSTRUCTION WITH AIR COOLING MEANS

Homer T. Lambert, St. Joseph, Mich.

Application October 3, 1940, Serial No. 359,593

3 Claims. (Cl. 188—264)

The present invention relates to improvements in brake constructions, and in particular to a mechanism designed for automotive vehicles in which an air circulation is producible for cooling the friction surfaces during braking application. More specifically, the invention resides in the novel construction of a wheel operated member to be braked such that a current of air is induced to flow through the brake housing and through said member itself as an incident to its rotation.

In the embodiment of the invention, the rotary braking member, a ring or disc in the preferred form, is constructed of spaced elements with intermediate connecting means for holding said elements in such spaced relation, and so arranged as to provide an annular series of channels which tend to draw the air into the brake housing about the friction surfaces to thereby dissipate the heat produced in the application of the brake instrumentalities.

To this end, the invention consists in the combination and arrangement of parts hereinafter more fully described, illustrated in the accompanying drawing, and particularly pointed out in the appended claims.

In the accompanying drawing:

Figure 1 is a fragmentary sectional view of a brake unit embodying the invention;

Figure 2 is a vertical sectional view therethrough taken at right angles to the section of Figure 3; and Figure 3 is a fragmentary section of the rotary braking disc somewhat enlarged to show more clearly the details of construction.

Like reference characters designate corresponding parts in the several figures of the drawing.

Referring to the drawing, the brake assembly unit comprises the drum or housing 1 having its entrance internally threaded, as at 2, to receive the externally threaded relatively stationary brake plate 3 to which the braking stresses are applied in brake application. This brake plate is preferably locked against accidental movement by means of the locking plate 4 attached to the disc 3 by the fastening bolt 5 through the provision of teeth 6 which interengage annular teeth 7 formed on the periphery of the brake drum.

Within the drum housing is arranged the usual rotary braking ring or disc 8 having apertured driving lugs 9 to receive the vehicle wheel studs (not shown) and to provide for rotation of this member with the wheel in the customary manner, said ring, however, being of special construction so as to function as an air impeller in cooling or ventilating the brake unit.

As will be noted in Figure 3, the ring 8 is composed of spaced plates 8a, 8a connected together by the spacing means 10, in the form illustrated, of a corrugated metal ring, the points of which contacting with the plates 8a are preferably spot welded thereto. Obviously, this sinusoidal member may be connected to the plates by rivets or other fastening means, if desired.

To the opposite faces of the ring 8 are attached the friction facings 11 by means of rivets 12, so as to provide a braking element or unit open at the center and adapted to be shifted into contact with the face of the brake disc 3 by means of the free floating pressure plate 13 mounted in the drum 1 by the annular flange 14 which extends into the channel 15 in the closed end of the drum.

The plate 13 is actuated hydraulically by the pressure fluid when introduced into the channel 15 in the customary manner, and upon contact of the plate 13 with the braking ring 8, the rotary motion of the same is picked up, causing the energizing means between the plate 13 and the housing 1 to produce auxiliary pressure for brake application purposes, after the customary manner of operation of the brake construction herein disclosed. It is sufficient to say that the energizing means referred to comprises a series of disc inserts 16 with camming faces and intermediate roller members 17.

Normally, the pressure plate 13 is held in retracted position by means of the springs 18.

It is sufficient for the purposes of this disclosure to state that the rotary member 8 to be braked is clamped between the pressure plate 13 and the stationary plate or disc 3, and its rotation by the wheel tends to produce, through centrifugal action, a high pressure zone at the periphery of the disc, thereby inducing a flow of air into the drum unit about the center portion thereof. The air is caused to travel through the radial channels formed by the member 10 and out the casing through the openings 19 in the periphery thereof. These openings are arranged at intervals about the casing and each provided with a hood 20. Since the air in passing through the channels is brought into contact with the inner faces of the spaced rings 8a, 8a, the heat developed in these parts by the friction set up through the brake lining 11 is quickly dissipated, and so long as the rotary braking element is rotating a cooling action of the brake instrumentalities is effected.

From the foregoing, it will be understood that the primary feature of these improvements resides in the special construction of the brake ring 8, and I desire it to be understood that the remaining details of construction of the brake unit illustrated herein are capable of being modified materially, and hence are employed more particularly as a preferred exemplification of the application of this air impeller construction. The corrugated spacing means 10 is of relatively stiff material so as to resist any possible material compression, but it possesses a sufficient amount of resiliency to act in the nature of a cushion to take up compressive stresses produced by the brake application of the braking parts.

Having thus described my invention, what I claim as new and desire to secure by Letters Patent is:

1. As a new article of manufacture, a rotary brake disc for vehicle brake units comprising spaced discs each having a central opening, a radially corrugated intermediate disc rigidly secured to said spaced discs having a central opening and constituting air impelling means extending between the spaced discs, and friction facings attached to exterior faces of the spaced discs.

2. In a rotary braking member for disc brakes, an air circulating disc comprising an annular plate corrugated radially and having a central opening therethrough, annular flat plates secured to the corrugations at each side of the air circulating disc, flat ring-shaped friction linings disposed on the opposite exterior sides of the annular plates and tie means between the friction linings securing the friction linings to the annular plates and said corrugated air circulating disc.

3. In a rotary braking member for disc brakes, an air circulating disc comprising an annular plate corrugated radially and having a central opening therethrough, annular flat plates secured to the corrugations at each side of the air circulating disc, flat ring-shaped friction linings disposed on the opposite exterior sides of the annular plates, tie means between the friction linings securing the friction linings to the annular plates and said corrugated air circulating disc, said tie means comprising rivets extending from side to side through openings formed in the side plates, said linings and the corrugated air circulating disc and having their heads secured against said linings below the outer friction surfaces thereof.

HOMER T. LAMBERT.